Aug. 30, 1949.  E. V. BERGSTROM  2,480,625
HYDROCARBON CONVERSION APPARATUS

Filed Aug. 31, 1946  4 Sheets-Sheet 1

INVENTOR
ERIC V. BERGSTROM
BY
John A. Crowley, Jr.
AGENT OR ATTORNEY

Aug. 30, 1949.  E. V. BERGSTROM  2,480,625
HYDROCARBON CONVERSION APPARATUS
Filed Aug. 31, 1946  4 Sheets-Sheet 2

INVENTOR
ERIC V. BERGSTROM
BY
John A. Crowley, Jr.
AGENT OR ATTORNEY

Aug. 30, 1949.　　　　E. V. BERGSTROM　　　2,480,625
HYDROCARBON CONVERSION APPARATUS
Filed Aug. 31, 1946　　　　　　　　　　　4 Sheets-Sheet 3
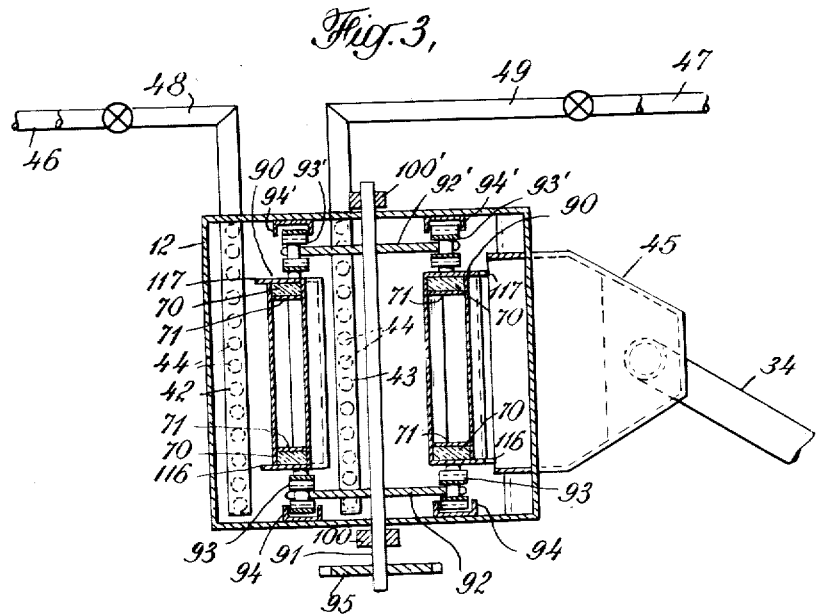
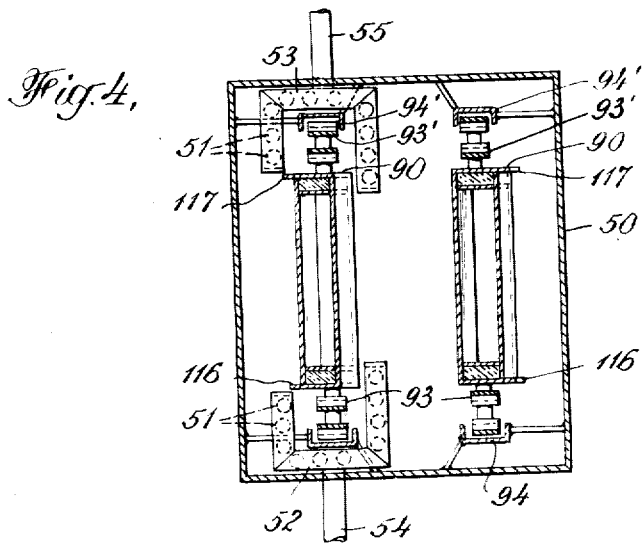
INVENTOR
ERIC V. BERGSTROM
BY John A. Crowley, Jr.
AGENT OR ATTORNEY Aug. 30, 1949. E. V. BERGSTROM 2,480,625
HYDROCARBON CONVERSION APPARATUS
Filed Aug. 31, 1946 4 Sheets-Sheet 4
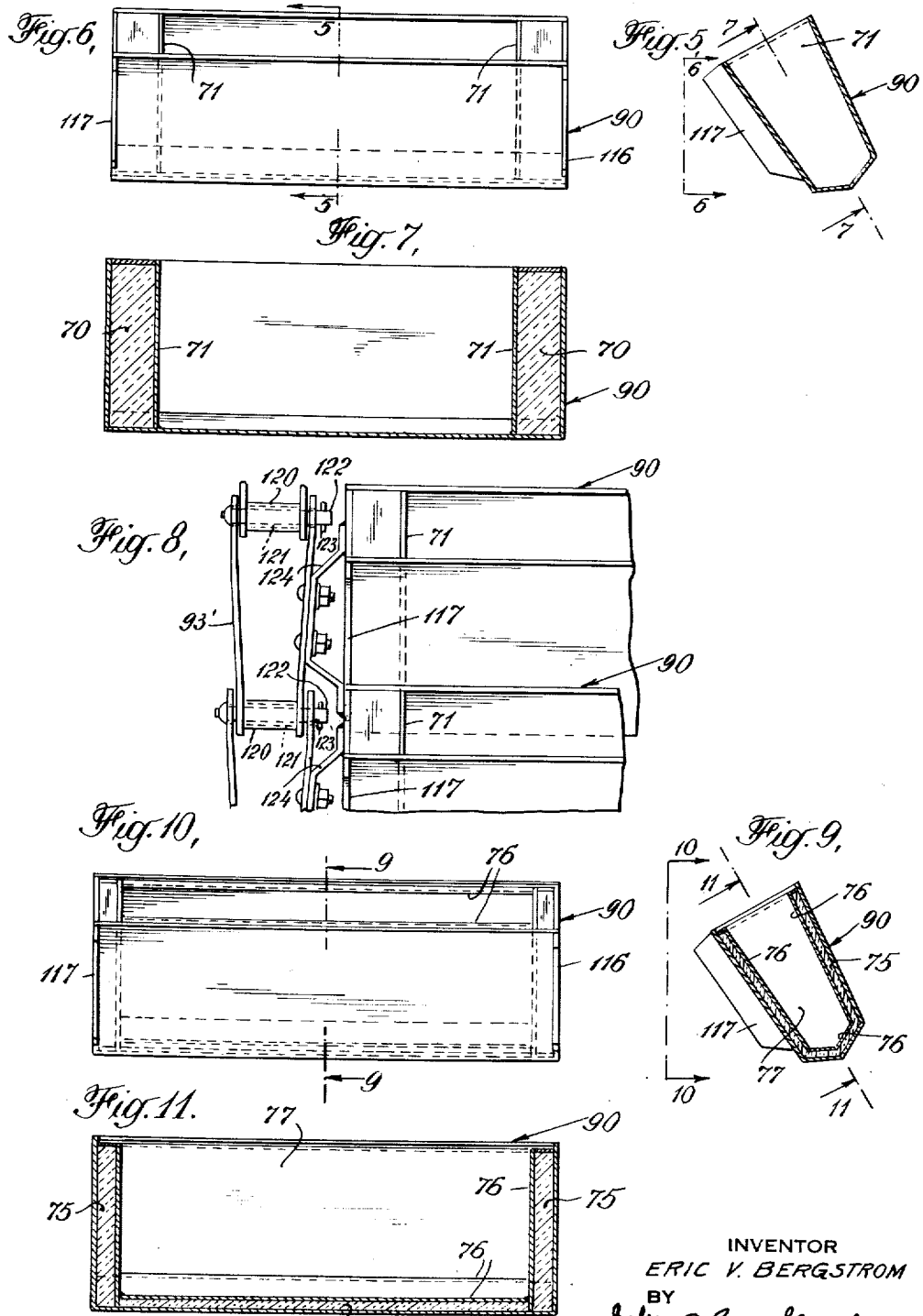
INVENTOR
ERIC V. BERGSTROM
BY
John A. Crowley, Jr.
AGENT OR ATTORNEY Patented Aug. 30, 1949

2,480,625

UNITED STATES PATENT OFFICE 2,480,625

HYDROCARBON CONVERSION APPARATUS

Eric V. Bergstrom, Short Hills, N. J., assignor to Socony-Vacuum Oil Company, Incorporated, a corporation of New York Application August 31, 1946, Serial No. 694,333

10 Claims. (Cl. 23—288)

This invention broadly pertains to a system for conducting gas-solid contact operations in the presence of a continuously moving particle form solid material at elevated temperature levels. It is specifically directed towards a system for conducting reactions of fluid reactants in the presence of moving particle form contact materials at temperature levels which are above those at which contact materials can be practically conveyed in conventional conveyor equipment and to an improved elevator for conveying contact materials at such elevated temperatures.

Exemplary of processes which require the handling of contact materials at very high temperature levels is the high temperature catalytic cracking conversion of hydrocarbons to high yields of aviation gasoline and $C_4$ fractions. Another process is the conversion of propane to acetylene at temperatures of the order of 2300° F. in the presence of an inert solid material. Another process is the dehydrogenation of butene to di-olefins at temperatures of the order of 1000° F. to 1300° F. in the presence of a dehydrogenation catalyst such as chromic oxide on alumina. Still another reaction is the pyrolysis of pentene-2 to butadiene at temperatures of the order of 1200–1300° F. Another reaction is the preparation of thiophene and butadiene by reaction between n-butane and sulfur vapors at temperatures of the order of 900–1300° F. Another process is the manufacture of ethylene by the cracking of heavier hydrocarbons such as gas oils or by the cracking of propane or ethane at temperatures of the order of 1450° F.–1800° F. Heretofore, due to the very high reaction temperatures involved, such processes as those described above, when conducted at all have generally been conducted in the presence of a fixed bed instead of in the presence of a moving bed. Recently it has been proposed to conduct such processes in the presence of a moving bed by the expedient of spraying water onto the contact material issuing from the reactor to cool it to a temperature low enough to permit its handling in a conventional conveyor by which it is carried to a revivifying zone. Since the revivifying zone in many processes really amounts to a heating zone wherein the contact material is heated to a sufficiently high level to support heat in the reaction zone into which it is passed from the revivifying zone it will be apparent that the above described water spray expedient results in a substantial loss in heat energy which is required for the subsequent reaction. The overall cost of the operation is consequently greatly increased. Moreover, in order to permit the transfer of contact material from the revivification zone to the reaction zone, it is necessary to position the revivification chamber vertically above the reaction chamber since conventional conveyors are incapable of handling the high temperature contact material. As a result the overall height of the conversion system becomes very great resulting in a considerable increase in structural support size and cost and complicating the operation control.

A major object of this invention is the provision of an apparatus for conducting such processes as described hereinabove which overcomes the above described difficulties.

Another object of this invention is the provision of a practical apparatus combination for conducting reactions involving gaseous reactants in the presence of a mass of moving solid material particles at reaction temperatures above those at which it has been heretofore practical to convey such solid particles.

A specific object of this invention is the provision of an improved elevator adapted to convey particle form contact materials existing at very high temperature levels.

These and other objects of this invention will become apparent in the following discussion of the invention. Before proceeding with this discussion several expressions used herein in describing and claiming this invention may be defined. The expression "gaseous" as used herein is intended broadly as meaning that the material involved exists in the gaseous phase under the particular operation conditions of temperature and pressure involved regardless of what may be the normal phase of that material under ordinary atmospheric conditions. The expressions "revivifier" or "revivification vessel" are intended to broadly cover a vessel in which used contact material from a conversion vessel may be made suitable for reuse in said conversion vessel regardless of the exact nature of the reaction occurring in the revivification vessel or regardless of whether or not any chemical reaction occurs therein at all. The term "revivifying gas" is employed in a similarly broad sense as meaning any gas which is suitable for restoring the contact material to a condition for practical reuse in the conversion zone. The expressions "heat damaging level" or "heat damaging temperature" are intended to mean a temperature or a temperature level which would cause substantial permanent impairment of that property or of those properties which render the particular contact material employed useful for the particular hydrocarbon conversion involved. The expression "fluid" is intended to mean material either in the liquid or gaseous phase or in mixed phase. The expression "contact material" is intended to broadly cover solid materials which are suitable for use in the particular conversion process involved regardless of whether or not said solid materials are catalytic in nature.

The invention may be best understood by reference to the drawings attached hereto of which Figure 1 is an elevational view showing a cyclic conversion process arranged according to the teaching of this invention.

Figure 3 is a sectional view taken along line 3—3 of Figure 2;

Figure 4 is a plan view taken across the central portion of a conveyor casing of the type shown in Figure 2 in which there is provided a somewhat modified tube arrangement;

Figure 5 is a detailed sectional view of one of the buckets used in the elevator shown in Figure 2;

Figure 6 is an elevational front view taken along line 6—6 of Figure 5;

Figure 7 is an elevational view in section taken along line 7—7 of Figure 5;

Figure 8 shows details of the bucket attachment to a conveyor chain;

Figure 9 is an elevational view in section of a modified bucket arrangement;

Figure 10 is a view taken along line 10—10 of Figure 9, and

Figure 11 is a view taken along line 11—11 of Figure 9.

All of these drawings are highly diagrammatic in form.

Figure 1:
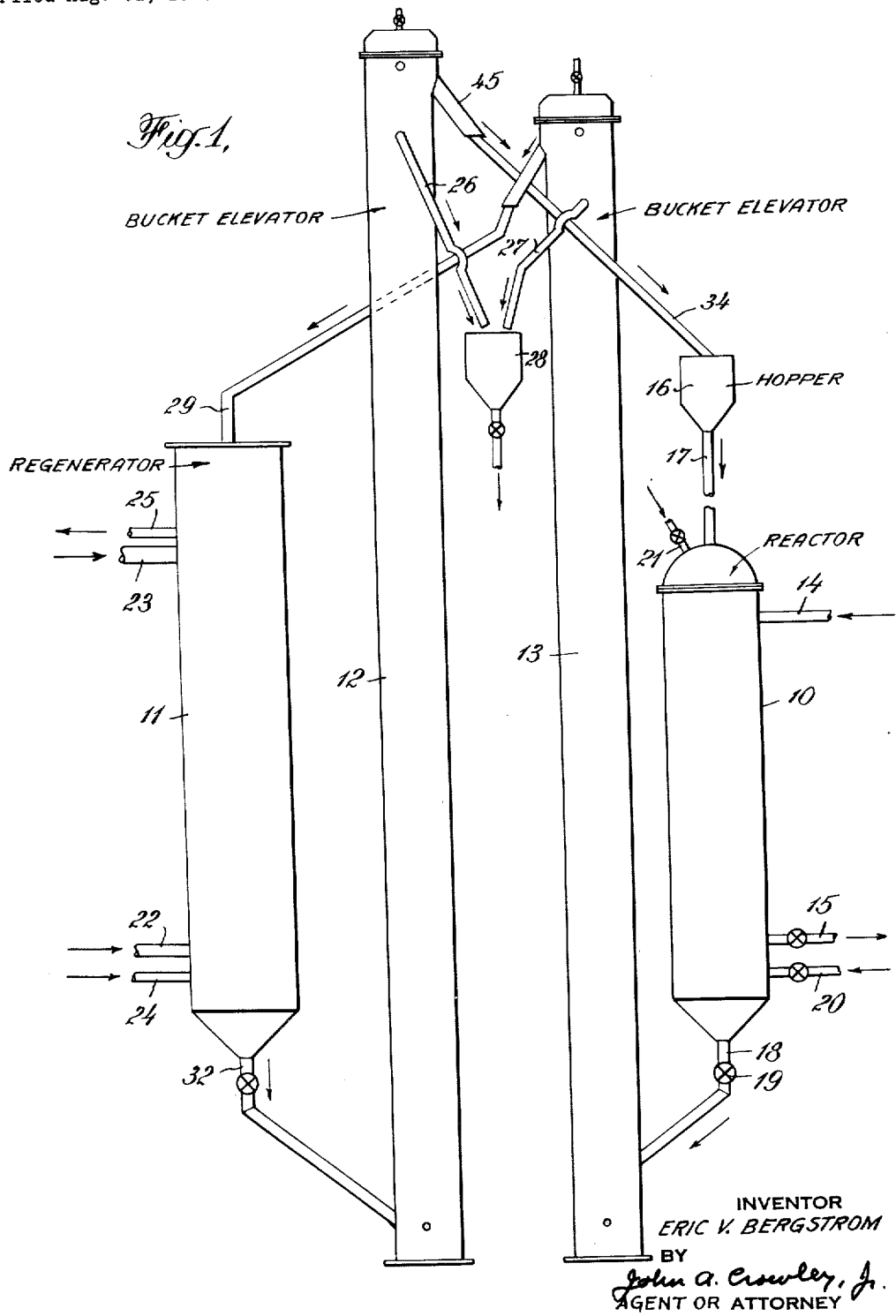

Turning now to Figure 1, we find a conversion vessel 10, a regeneration vessel 11 and elevators 12 and 13 for transferring solids from one vessel to the other. Hydrocarbon reactants heated in a conventional external system (not shown) may be introduced into the lower section of the conversion vessel through inlet 14. Gaseous conversion products may be withdrawn near the upper end of vessel 10 through outlet 15. Particle form contact material may be supplied to the upper end of the vessel 10 from supply hopper 16 through a gravity feed leg 17. Used contact material may be withdrawn from the lower end of vessel 10 through outlet conduit 18 bearing flow control valve 19. The outflowing contact material may be purged free of reactant gases by means of a purge gas such as steam or flue gas introduced into vessel 10 through conduit 20. A seal of steam or flue gas, etc. may be maintained adjacent the upper end of the reaction zone by introduction of a suitable seal gas through conduit 21. The regenerator 11 is provided with a solid inlet 22 at its upper end and a solid outlet 32 on its lower end. Regeneration gas such as air may be introduced to vessel 11 through conduit 22 near its lower end, and gaseous regeneration products may be withdrawn through conduit 23 near the upper end of vessel 11. When desired a suitable heat exchange fluid may be passed through heat transfer tubes (not shown) within vessel 11 for the purposes of controlling the temperature of the contact material during its regeneration. The heat exchange fluid may be introduced to the tubes through inlet 24 and withdrawn through outlet 25. It will be understood that the invention is not restricted to any particular reactor or regenerator construction. These vessels may, if desired, be adapted for concurrent flow of gas and solids and they may be of the multi-stage variety. In many operations the regenerator or revivification vessel may consist merely of a vessel adapted for heating the solid material particles by passage of hot gas therethrough or by burning fuels in contact with the solid particles. This type of revivifier may be employed, for example in a process for manufacture of ethylene by the cracking of ethane or butane gas in the presence of an inert solid material. The reaction in such a process is highly endothermic in nature and the amount of coke deposited on the inert is far short of that which on burning would supply the heat for the cracking reaction. In such processes the contact material may pass cyclically through other chambers in addition to the conversion and revivification chambers, such other chambers being added for special purposes required by the particular process involved. The system shown in Figure 1 is particularly well adapted for the high temperature catalytic or thermal conversion of fluid petroleum charging stocks to lower boiling products containing aviation gasoline and large percentages of $C_4$ hydrocarbons.

In operation contact material existing at a high enough temperature to supply the heat required for the cracking reaction is passed through reactor 10 while contacting it with gaseous or liquid hydrocarbon reactants to effect their conversion to lower boiling hydrocarbons. Used contact material passes through conduit or chute 18 from reactor 10 to elevator 13 by which it is conducted to conduit 29 feeding the regenerator. It is contacted with a combustion supporting gas such as air in the regenerator to burn off carbonaceous contaminants deposited during the hydrocarbon conversion. The temperature of the contact material may be controlled by means of indirect heat transfer from a cooling fluid below a heat damaging level during its regeneration. Hot contact material which in many operations may exist at a temperature of the order of 1050–1200° F. is passed from the regenerator through conduit 32 to elevator 12 by which it is conducted to duct 34 feeding the reactor supply hopper 16. These temperature levels are above those at which conventional elevator equipment can be practically used, because of the failure of moving parts such as iron or even alloy elevator chains to withstand these temperatures even to a reasonable degree. The improved conveyor provided by this invention is capable of handling particle-form contact materials at these temperature levels over long periods of time and thereby makes possible the application of the continuous moving bed technique to many processes for which it has been heretofore unavailable.

Figure 2:
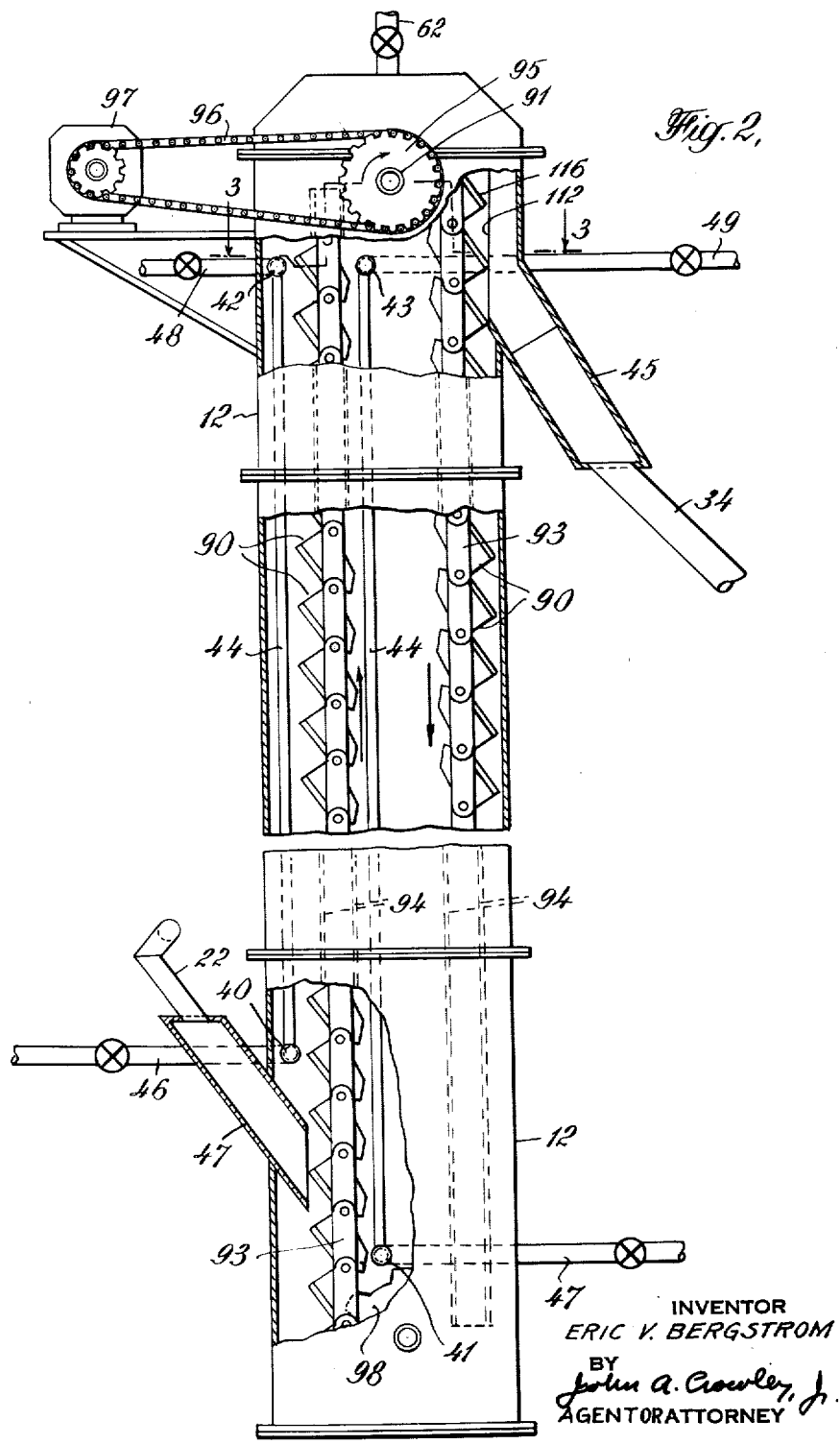
Figure 2 is an elevational view, partially in section, showing an assembly view of one of the elevators shown in Figure 1.

Turning now to Figures 2 and 3 which may be best considered together for a more detailed study of the construction of the elevators. In Figure 2 one elevator 12 is shown the construction of which is represented by both elevators. It will be seen that the casing of each elevator is made up of a foot portion, a head portion and an intermediate portion. The casing 12 may be made up in a single section but it is preferably made up of a plurality of flanged sections and generally at least of three sections, namely, a head section, an intermediate section and a foot section. Within the casing is provided an endless series of buckets 90 which preferably overlap to a limited extent substantially as shown in Figure 2. A head shaft 91 passes through the casing in the head portion and two spaced apart wheels 92 and 92' are provided on the head shaft. Continuous chains 93 and 93' are trained over the wheels 92 and 92' so as to form a loop in the head portion of the casing and a second loop in the foot portion. The chains may be guided by guides indicated by the dotted lines 94 attached along opposite sides of casing 12 and by means of the traction wheels 98 at the foot loop. In some constructions the wheels 98 may be omitted and other guides for the chains provided in the foot section. The head shaft is driven by an externally located drive wheel 95 driven in turn through chain 96 by motor 97. The buckets 90 may take any of a number of cross-sectional shapes, a preferred shape being approximately that indicated in Figures 5, 6 and 7. The buckets are attached on their opposite ends to the two chains 93 and 93' in such a manner as to open outwardly of their closed path of travel and in such a manner as to open outwardly and upwardly as they move upwardly adjacent that side of the casing 12 into which the feed chute 47 connects and as to be inverted as they move downwardly adjacent that side of the casing 12 into which the discharge chute 45 connects. The buckets are further so shaped and fastened to the chains 93 and 93' that in passing over the head loop or the wheels 92 and 92', each bucket discharges contact material onto one side of the inverted bucket moving immediately before it and the side of the latter bucket is so sloped as to direct the contact material into the discharge chute 45. It will be noted that the discharge chute extends into the conveyor casing to such an extent that the chute opening is close to the edges of the buckets as they pass downwardly in their path. The arrangement is such that the contact material is poured from the buckets into the discharge chute rather than being thrown as is the case in centrifugal type bucket elevators. The construction described hereinabove permits discharge of contact material from the buckets into the discharge chute with very little spillage of contact material occurring. The feed chute 47 similarly extends a short distance into the casing 22 so as to terminate just opposite the edge of the open tops of the buckets 90 so that contact material pours directly from chute 47 into the upwardly moving buckets 90 without substantial spillage of contact material into the foot section of the casing. Extending into and across the lower section of the casing 12 on either side of the chains 93 and 93' and buckets 90 in that portion of the casing in which their path of movement is upwards are cooling fluid inlet manifolds 40 and 41. Similarly positioned outlet manifolds 42 and 43 are located in the upper section of the casing 12. A plurality of spaced vertical tubes 44 are connected between manifolds 40 and 42 and a plurality of spaced vertical tubes are also connected between manifolds 41 and 43 so as to provide heat transfer surface near and on either side of the buckets and chains along a major portion of their upward path of travel. A suitable cooling fluid such as water, air, steam, molten inorganic salts or metallic alloys may be introduced into manifolds 40 and 41 through inlet 46 and 47 respectively and withdrawn from manifolds 42 and 43 through outlets 48 and 49 respectively. Other arrangements of inlet and outlet manifolds and cooling tubes are contemplated within the scope of this invention. Such another arrangement is shown in Figure 4 which is a sectional plan view taken across an elevator casing about midway of its length. In the arrangement shown in Figure 4 vertical cooling tubes 51 are positioned around three sides of each chain 93 and 93' on that side of the casing 50 in which the chain movement is upward. The tubes are supplied by V-shaped inlet manifolds 52 and 53 which are positioned within the foot section of the elevator casing and supplied through inlet conduits 54 and 55 respectively. Similar outlet manifolds are connected to the upper ends of the tubes 51. Other elements in Figure 4 are substantially the same as in Figure 3 and bear like numerals.

For a study of the bucket construction Figures 5, 6, 7 and 8 should be considered along with Figures 2 and 3. It will be noted that vanes 116 and 117 are fastened along opposite ends of the buckets along that side of each bucket onto which contact material is poured from the next bucket on the chain in the conveyor head section. These vanes prevent discharged solid material from falling off the ends of the buckets and provides a passaage for solid flow over the side of each bucket into the discharge chute 45 as the buckets move in that portion of their path of travel just above and adjacent the location of the chute 45. Each bucket is attached on either end to an elevator chain. The attachment details may best be understood by reference to Figure 8 which shows a section of one of the elevator chains and the bucket attachment thereto. From Figure 8 it will be seen that the chain is a knuckle chain of the offset type. Each link has near one end a knuckle 110 in which is a bushing indicated by dotted lines at 111. A chain pin 112 fits through the bushing 111 and through holes in the offset side bars of the next link. A keeper pin 113 may be employed to hold the chain pin in place. To each end of the bucket is welded or bolted an attachment bar or bracket 114 which in turn is bolted to one of the elevator chains such as chain 93'. Along the opposite ends of each bucket which ends are attached to the chains 93 and 93' as described hereinabove, there is provided a layer of insulating material 70 which is adapted to shield the entire end wall of the bucket from the hot contact material which it carries during the upward portion of its path of travel. The insulating material may be any of a number of types having a high insulating value and being adapted to withstand the high temperature levels involved without loss of its insulating properties. If desired a metal casing 71 may be provided to protect the insulation from wear due to contact with the solid particles.

It has been found that by means of insulating the ends of the buckets as shown and by the provision of cooling tubes adapted to cool the elevator chains by radiation, the temperature of the chains may be maintained at a level permitting long continuous operation without excessive wear even though the contact material conveyed exists at temperatures far above the chain temperatures.

It will be understood that the shape and construction of the elevator buckets and the method of their attachment to the conveyor chain may vary widely from that shown in Figures 5-8 inclusive. Also for particularly high temperature operations it has been found desirable to entirely insulate all the walls of each bucket. Such construction is shown in Figures 9, 10 and 11 in which buckets 90 are shown with an insulation lining 15 provided along all of its internal walls. The insulation is protected by metal sheeting 16 so that a jacketed pocket 17 for receiving hot solid material is provided, which pocket is entirely surrounded by insulation except along its open side. This arrangement when used in conjunction with the cooling tube arrangement shown in Figures 2 and 3 within the elevator casing permits the transfer of solid particles existing at very high temperatures without substantial undesirable heat loss from the solid material while at the same time permitting the maintenance of the elevator buckets and chains at a temperature level at which warpage, misalignment and premature destruction will not occur.

It will be understood that for different applications of this invention the amount of cooling tube surface provided within the conveyor casing and the thickness of the insulation layer provided within the conveyor buckets are to some extent interdependent and both are dependent upon the particular operating conditions and materials involved and upon the spread between elevator bucket and chain temperature and that of the solid particles carried in the buckets. For any given application of the invention, once having decided upon the operation conditions, the amount of insulation in the buckets and the amount of cooling tube surface required in the conveyor casing may be readily calculated by known methods.

It should be understood that while the particular form of elevator and bucket construction shown diagrammatically in the drawings are preferred forms of the invention, nevertheless the form shown is intended as illustrative and it is contemplated that this invention may be applied to bucket elevators of modified construction. It should be further understood that the examples of the application of this invention given hereinabove are illustrative and that the invention is not intended to be limited by the illustrations of apparatus design and application except as it may be limited in the following claims.

I claim:

1. An elevator for conveying hot particle-form contact materials which comprises in combination: a casing, within said casing an endless series of articulated buckets, chain means for supporting said series of buckets and to cause the same to travel in a closed path within said casing with said path forming a head loop and a foot loop, heat insulating material within said buckets adapted to shield the portions of said buckets which contact said chain means from the hot solid particles carried in said buckets, means to direct the flow of hot solid particles into said buckets near said foot loop, means to receive and withdraw solid particles discharged from said buckets near said head loop, cooling tubes within said casing along the major portion of the length, said tubes being adapted to cool said chain means and means to pass a suitable cooling fluid through said cooling tubes.

2. An elevator for conveying hot particle-form contact materials which comprises in combination: a casing, within said casing an endless series of articulated buckets, chain means connected to said buckets to support said buckets and cause them to move within a closed path within said casing with said path forming a head loop and a foot loop, means to drive said chain means, a feeding chute adapted to direct hot solid particles into said buckets near said foot loop, a receiving chute adapted to receive and withdraw solid particles discharged from said buckets near said head loop, means defining a confined passage for cooling fluid flow within said casing extending along a major portion of its length and positioned near said chain means, means to pass a suitable cooling fluid through said confined passage so as to cool said chain means, and insulating material within each bucket adapted to shield the hot solid particles therein from that portion of said bucket which is connected to said chain means.

3. An elevator for conveying hot particle-form solid particles comprising: an elongated upwardly extending casing having a head section and a foot section, an endless series of articulated buckets within said casing, at least one endless chain connected to said buckets adapted to support said buckets and to move them in a closed path forming a loop in both the head and foot sections of said casing, insulating material lining the walls of said buckets adapted to form an inner compartment for receiving said hot solid particles in each bucket which compartment is shielded by said insulation material from the exterior walls of said buckets, a feeding spout adapted to direct the flow of hot particle-form solid material from an external location into said buckets as they move upwardly in the foot section of said casing, a discharge chute adapted to catch solid material discharged from said buckets in the head section of said casing, means defining a confined passage for flow of a cooling fluid within said casing along a major portion of its length, said passage being positioned near the buckets and chain on that side of said casing wherein the path of bucket travel is upward and means to pass a suitable cooling fluid through said confined passage.

4. An elevator for conveying hot particle-form solid particles comprising: an elongated upwardly extending casing having a head section and a foot section, an endless series of articulated buckets within said casing, at least one endless chain connected to said buckets adapted to support said buckets and to move them in a closed path forming a loop in both the head and foot sections of said casing, means defining an enclosed jacket along the walls on the inside of each of said buckets so as to provide a jacket surrounded receiving pocket for hot solids, said pocket being open along one side to receive solids, heat insulating material within said jacket, a feeding spout adapted to direct the flow of hot particle-form solid material from an external location into said buckets as they move upwardly in the foot section of said casing, a discharge chute adapted to catch solid material discharged from said buckets in the head section of said casing, a plurality of heat transfer tubes positioned with said casing along a major portion of its length, said tubes being located near the buckets and chain on that side of the casing in which they move upwardly, and means to pass a suitable cooling fluid through said tubes.

5. An elevator for conveying hot particle-form solid particles comprising: an elongated upwardly extending casing having a head section and a foot section, an endless series of articulated buckets within said casing, two endless chains within said casing, one chain being connected to each end of each bucket, said chains being adapted to form a closed path of travel having a head loop and a foot loop within said casing, heat insulating material within each bucket at least along the opposite ends of said bucket to shield the ends to which said chain is connected from the hot solid material carried in said buckets during their upward path of travel, a feed spout connecting into the foot section of said casing adapted to direct flow of hot particle-form solids into said buckets as they move upwardly, a discharge spout connecting into the head section of said casing adapted to receive and withdraw solids discharged from said buckets in said head section, heat transfer tubes within said casing substantially along the entire length of the path of upward bucket and chain travel, said tubes being positioned to cool said chains by radiation, and means to pass a suitable cooling fluid through said tubes.

6. In an elevator of the type described, an elongated upwardly extending casing having a head portion and a foot portion, a head shaft passing through the casing in said head portion and having a pair of spaced driving wheels mounted thereon, a pair of endless chains trained over said driving wheels and adapted to travel a closed path looping in the head and foot positions of said casing, an endless series of buckets positioned between and attached to said chains, a feeding spout connecting into the lower portion of said casing above the foot loop of said chains and adapted to direct flow of hot solids into said buckets as they move upwardly, a discharge spout connecting into the upper portion of said casing below the head loop of said chains and adapted to receive solid material discharged from said buckets, insulating material within said buckets along opposite ends adjacent said chains adapted to shield said ends from the hot solid particles carried within said buckets, cooling tubes positioned within said casing along a major portion of its length, said tubes being positioned near the buckets and chains on that side of the casing in which they move upwardly and means to pass a suitable cooling fluid through said tubes.

7. In an elevator of the type described, an elongated upwardly extending casing having a head portion and a foot portion, a head shaft passing through the casing in said head portion and having a pair of spaced driving wheels mounted thereon, a pair of endless chains trained over said driving wheels and adapted to travel a closed path looping in the head and foot portions of said casing, an endless series of buckets positioned between and attached to said chains in such a manner that said buckets are upright so as to hold solids as they move upwardly and inverted as they move downwardly within their path of travel, a feeding spout connecting into the lower portion of said casing above the foot loop of said chains and adapted to direct flow of hot solids into said buckets as they move upwardly, a discharge spout connecting into the upper portion of said casing below the head loop of said chains and adapted to receive solid material discharged from said buckets, insulating material within said buckets along opposite ends adjacent said chains adapted to shield said ends from the hot solid particles carried within said buckets, cooling tubes positioned within said casing along a major portion of its length, said tubes being positioned near the buckets and chains on that side of the casing in which they move upwardly both on the inside and outside of the closed path of bucket and chain travel and means to pass a suitable cooling fluid through said tubes.

8. In an apparatus for conversion of fluid hydrocarbons in the presence of a moving particle-form solid contact material at elevated temperatures the apparatus which comprises in combination: means defining a conversion chamber adapted to confine a substantially compact column of particle-form contact material, means to admit fluid reactant thereinto, means to withdraw gaseous reaction products therefrom, means defining a separate contact material regeneration chamber, gas inlet means thereto, gas outlet means therefrom, a substantially vertical, elongated elevator casing having a head section and a foot section, a contact material feeding spout connecting into one side of said casing near its lower end, a discharge spout connecting into the opposite side of said casing near its upper end, a head shaft passing through the casing head section above said discharge spout, a pair of spaced driving wheels on said shaft, a pair of endless chains trained over said wheels to form a loop above said discharge spout and a second loop in the lower section of said casing below said feed spout, a series of overlapping buckets arranged between and attached to said chains, said buckets opening toward the outside of their path of travel and being so arranged as to become inverted during that portion of their path of travel which is downward and which is on that side of said casing into which said discharge spout connects so that contact material is poured from said buckets toward said discharge spout as said buckets pass around the head loop of the path, means to withdraw contact material from said discharge spout, means to pass said withdrawn contact material to said conversion chamber, means to maintain a substantially inert gaseous seal between said conversion chamber and the elevator casing, means to pass hot contact material from the bottom of said regeneration chamber into said feed spout, heat insulating material within each of said buckets adapted to at least shield those ends of said bucket which are attached to said chains from contact with said hot contact material within said bucket, heat transfer tubes within said casing along a substantial portion of its length and positioned near the buckets and chains on that side of said casing in which they move upwardly and means to pass a cooling fluid through said tubes.

9. In an apparatus of the type described a conversion chamber adapted to permit contacting of fluid hydrocarbon reactants with a moving column of particle-form solid material, a revivification chamber adapted to permit contacting of said solid material moving as a substantially compact column with a suitable revivifying gas, a separate, upwardly extending closed elevator casing formed of a head portion, an intermediate portion and a foot portion, a head shaft having a pair of spaced drive wheels, passing through the casing head portion, endless chains trained over said wheels to form a loop in said head portion and a loop in said foot portion, a series of buckets arranged between and attached to said chains, said buckets opening toward the outside of their path of travel and being inverted during that portion of the path of travel wherein they move downwardly, means defining a jacket along the inner walls of each bucket so as to provide a jacketed compartment for holding the hot contact material in each bucket, a suitable heat insulating material within said jacket, means to direct the flow of a stream of hot revivified contact material into the jacketed compartments in said buckets as said buckets move upwardly in the lower section of said casing, while substantially preventing gaseous reactant flow into said casing, means to catch the revivified contact material discharged from said compartments as said buckets pass over the head loop and means to pass the revivified contact material to said conversion chamber, a plurality of heat transfer tubes positioned within said casing along a major portion of its length said tubes being located around and near the buckets and chains in that portion of the casing in which the buckets and chain move upwardly so as to cool the outer walls of said buckets and said chains by radiation and means to pass a suitable cooling fluid through said tubes.

10. An apparatus for continuous conversion of fluid hydrocarbons in the presence of a moving mass of particle-form solid contact material at elevated temperatures which apparatus comprises: a confined conversion vessel having an inlet for fluid hydrocarbon reactants and an outlet for gaseous hydrocarbon products, a separate confined revivification vessel having an inlet of revivifying gas and an outlet for used revivifying gas, an elongated upwardly extending conveyor casing, an endless series of articulated buckets adapted to travel in a closed path in said casing with said path looping in upper portion and in the lower portion of said casing, endless chain means to move said series of buckets in said closed path, passage defining mean adapted to direct flow of hot contact material from said revivification vessel into said buckets as said buckets pass upwardly in their path within the lower section of said conveyor casing, passage defining means adapted to catch said hot revivified contact material as it is discharged from said buckets near the upper end of said conveyor casing and adapted to direct the flow of said used contact material into said conversion vessel, a layer of heat insulating material within each of said buckets along at least those walls of the buckets which are connected to said chain means adapted to insulate said walls from the hot contact material carried in the buckets, a plurality of cooling tubes positioned within said casing near the chain means and buckets in that portion of the casing in which their paths of travel is upwards, and means to pass a cooling fluid through said tubes.

ERIC V. BERGSTROM.

REFERENCES CITED

The following references are of record in the file of this patent:

UNITED STATES PATENTS

| Number | Name | Date |
| --- | --- | --- |
| 1,719,596 | Beardsley et al. | July 2, 1929 |
| 1,753,914 | Bodge et al. | Apr. 8, 1930 |
| 2,016,793 | Tveit | Oct. 8, 1935 |
| 2,376,365 | Lassiat | May 22, 1945 |
| 2,379,195 | Simpson et al. | June 26, 1945 |